US012771971B2

(12) United States Patent
Zhu et al.

(10) Patent No.: US 12,771,971 B2
(45) Date of Patent: Oct. 20, 2026

(54) SYSTEM AND METHOD FOR MONITORING TEMPERATURE ON A ROOF

(71) Applicant: Atlas-Apex Roofing Inc., Etobicoke (CA)

(72) Inventors: Xuewen Zhu, Markham (CA); Jiang Li, Thornhill (CA); Jianbin Xiao, Richmond Hill (CA); John Petrachek, Etobicoke (CA)

(73) Assignee: Atlas-Apex Roofing Inc., Etobicoke (CA)

( * ) Notice: Subject to any disclaimer, the term of this patent is extended or adjusted under 35 U.S.C. 154(b) by 0 days.

(21) Appl. No.: 18/123,671

(22) Filed: Mar. 20, 2023

(65) Prior Publication Data

US 2023/0379603 A1 Nov. 23, 2023

Related U.S. Application Data

(63) Continuation of application No. 15/674,774, filed on Aug. 11, 2017, now Pat. No. 11,611,814.
(Continued)

(51) Int. Cl.
*H04Q 9/00* (2006.01)
*E04D 5/14* (2006.01)
(Continued)

(52) U.S. Cl.
CPC ............... *H04Q 9/00* (2013.01); *E04D 13/00* (2013.01); *G01F 23/30* (2013.01); *G01K 1/024* (2013.01);
(Continued)

(58) Field of Classification Search
CPC ................ H04Q 9/00; H04Q 2209/00; H04Q 2209/10; H04Q 2209/40; H04Q 2209/70;
(Continued)

(56) References Cited

U.S. PATENT DOCUMENTS

| | | | | |
|---|---|---|---|---|
| 3,430,491 | A | 3/1969 | Gignilliat | |
| 7,806,195 | B2 * | 10/2010 | Popp | G01J 5/0014 169/56 |

(Continued)

FOREIGN PATENT DOCUMENTS

| | | | | | |
|---|---|---|---|---|---|
| CA | 2762483 | A1 * | 6/2012 | | H04L 67/60 |
| EP | 3021267 | A1 * | 5/2016 | | G06Q 10/00 |

(Continued)

OTHER PUBLICATIONS

Monnit Corp, Wireless sensor product page, downloaded from https://www.monnit.com/ProductSoftwarePlatform/FilterResult?productCategoryID=1.
Roof Monitor, Roof Sensor product page, downloaded from http://www.roofmonitor.com/roof-sensor.

*Primary Examiner* — John E Breene
*Assistant Examiner* — Janice M Soto
(74) *Attorney, Agent, or Firm* — Smart & Biggar LP

(57) ABSTRACT

A temperature monitor, a system, and a method monitor temperature on a roof. The temperature monitor includes a base for attaching to the roof, a temperature sensor for detecting changes in temperature, the temperature sensor is attached to the base and positioned periodically on the base, and a roof sensor device attached to the base for transmitting measurement data received from the temperature sensor.

11 Claims, 14 Drawing Sheets

Related U.S. Application Data

(60) Provisional application No. 62/375,687, filed on Aug. 16, 2016.

(51) Int. Cl.

| | |
|---|---|
| ***E04D 13/00*** | (2006.01) |
| ***G01F 23/30*** | (2006.01) |
| ***G01K 1/024*** | (2021.01) |
| ***G01K 1/14*** | (2021.01) |
| ***G08B 17/06*** | (2006.01) |
| ***G08B 21/18*** | (2006.01) |
| ***H04L 67/12*** | (2022.01) |
| ***H04L 67/53*** | (2022.01) |
| ***H04L 67/55*** | (2022.01) |

(52) U.S. Cl.
CPC ............... *G01K 1/14* (2013.01); *G08B 17/06* (2013.01); *G08B 21/182* (2013.01); *H04L 67/12* (2013.01); *H04L 67/53* (2022.05); *H04L 67/55* (2022.05); *E04D 5/148* (2013.01); *H04Q 2209/00* (2013.01); *H04Q 2209/10* (2013.01); *H04Q 2209/40* (2013.01); *H04Q 2209/70* (2013.01)

(58) Field of Classification Search
CPC ......... E04D 13/00; E04D 5/148; G01F 23/30; G01K 1/024; G01K 1/14; G08B 17/06; G08B 21/182; H04L 67/12; H04L 67/53; H04L 67/55
See application file for complete search history.

(56) References Cited

U.S. PATENT DOCUMENTS

| | | | | |
|---|---|---|---|---|
| 2007/0285238 | A1* | 12/2007 | Batra | G06K 19/0717 374/E1.004 |
| 2010/0070097 | A1* | 3/2010 | Morgenstern | A62C 35/64 700/283 |
| 2010/0177801 | A1 | 7/2010 | Geren et al. | |
| 2011/0115613 | A1 | 5/2011 | Kaga et al. | |
| 2012/0062384 | A1 | 3/2012 | McDanal et al. | |
| 2014/0086121 | A1* | 3/2014 | Emeott | H04L 61/30 370/311 |
| 2015/0259923 | A1* | 9/2015 | Sleeman | E04D 13/006 52/173.1 |
| 2016/0244962 | A1* | 8/2016 | Burton | F24F 7/025 |
| 2017/0097259 | A1* | 4/2017 | Brown | G01J 1/4228 |

FOREIGN PATENT DOCUMENTS

| | | | | |
|---|---|---|---|---|
| JP | 2011170877 A | * | 9/2011 | |
| JP | 5921198 B2 | * | 5/2016 | G08B 17/00 |

* cited by examiner

SYSTEM AND METHOD FOR MONITORING TEMPERATURE ON A ROOF

CROSS REFERENCE TO RELATED APPLICATIONS

This application is a continuation of U.S. patent application Ser. No. 15/674,774, filed Aug. 11, 2017, which claims the benefit of U.S. Provisional Patent Application No. 62/375,687, filed Aug. 16, 2016, the contents of which are incorporated herein by reference for all purposes.

TECHNICAL FIELD

The embodiments disclosed herein relate to roofing, and, in particular to systems and methods for monitoring a roof.

INTRODUCTION

A flat roof is a roof which is almost level in contrast to the many types of sloped roofs. The slope of a roof is known as its pitch and flat roofs have up to an approximately 10 degree pitch. Flat roofs may be used for commercial or institutional buildings may allow the increased commercial space below.

When sealing a roof seam, materials such as modified bitumen melt to connect the seal, and temperatures continue to increase. A fire gun is used to seal the seam or tar is boiled to start the chemical reaction. However, once a roofing job has been completed the temperature at the seam may continue to increase, often overnight. In conventional systems, a worker will need to inspect and monitor each roof seam.

The need to know when the temperature is functioning properly is important as it alerts the building owner of a potential problem with the installation, whether it be a problem with the roof seam dome or an actual fire on the roof. Conventional systems rely a building manager observing the perimeter of the building or performing a visual inspection of on the roof. Accordingly, there is a need for an improved method and system for monitoring a roof.

SUMMARY

According to some embodiments, there is a temperature monitor for monitoring temperature on a roof. The temperature monitor includes a base for attaching to the roof, a temperature sensor for detecting changes in temperature, the temperature sensor is attached to the base and positioned periodically on the base, and a roof sensor device attached to the base for transmitting measurement data received from the temperature sensor.

The temperature sensor may detect the temperature on the roof.

The temperature sensor may be electrically connected to a plurality of circuitry, wherein the circuitry includes an integrated circuit power supply connection, a data signal connection, and a ground connection.

The circuitry may be positioned between temperature sensors such that the base may be cut at the circuitry between the temperature sensors, such that the temperature monitor is adjustable in length.

The circuitry may be positioned on both a top surface of the base and the bottom surface of the base such that the circuitry from adjacent pieces of the temperature monitor connect.

The temperature sensors may be embedded in a strip central to the temperature monitor.

The temperature monitor may further include a plurality of segmenting indictors positioned between the temperature sensors.

The temperature monitor may further include a cutout such that the temperature monitor may be placed around a drain seam.

The temperature monitor and the cutout may be circularly shaped.

According to some embodiments, there is a temperature monitoring system. The system includes a roof sensor device configured to measure temperature on a roof and transmit a temperature signal, and a system gateway configured to receive the temperature signal and transmit the temperature signal to a system server.

The temperature monitoring system may further include a system server configured to receive the temperature signal and send roof data, alerts, and warnings to at least one user communication device.

The user communication device may be configured for any one or more of a property manager user, a roofer user, a consultant user, or an insurance company user.

The roof sensor device may include at least one temperature sensor for measuring temperature on the roof, a database for storing the measurement data received from the at least one temperature sensor, a processor for processing the measurement data, and a transceiver for sending and receiving data messages from the system gateway.

The roof sensor device may include a power supply for providing power to the transceiver, the database, and the processor.

The system gateway may be configured to receive third party weather data and wherein the roof sensor device modifies the frequency of temperature measurement based on the third party weather data.

The temperature monitoring system may further include a plurality of roof sensor devices, and wherein the user communication device displays a location of the roof sensor devices on a satellite image of a buildings that the roof sensor devices are installed.

According to some embodiments, there is a method for roof monitoring. The method includes sensing a temperature, transmitting a temperature reading to a system gateway, collecting the temperature reading, creating a visualization of the temperature readings, and sending the visualization to a user.

The visualization may include an alarm indicating a high temperature.

The method may further include collecting the temperature readings at a predetermined polling period based on environmental data.

The method may further include determining if the environmental data has reached a threshold and where the environment data has reached the threshold, sending an alarm to a user.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
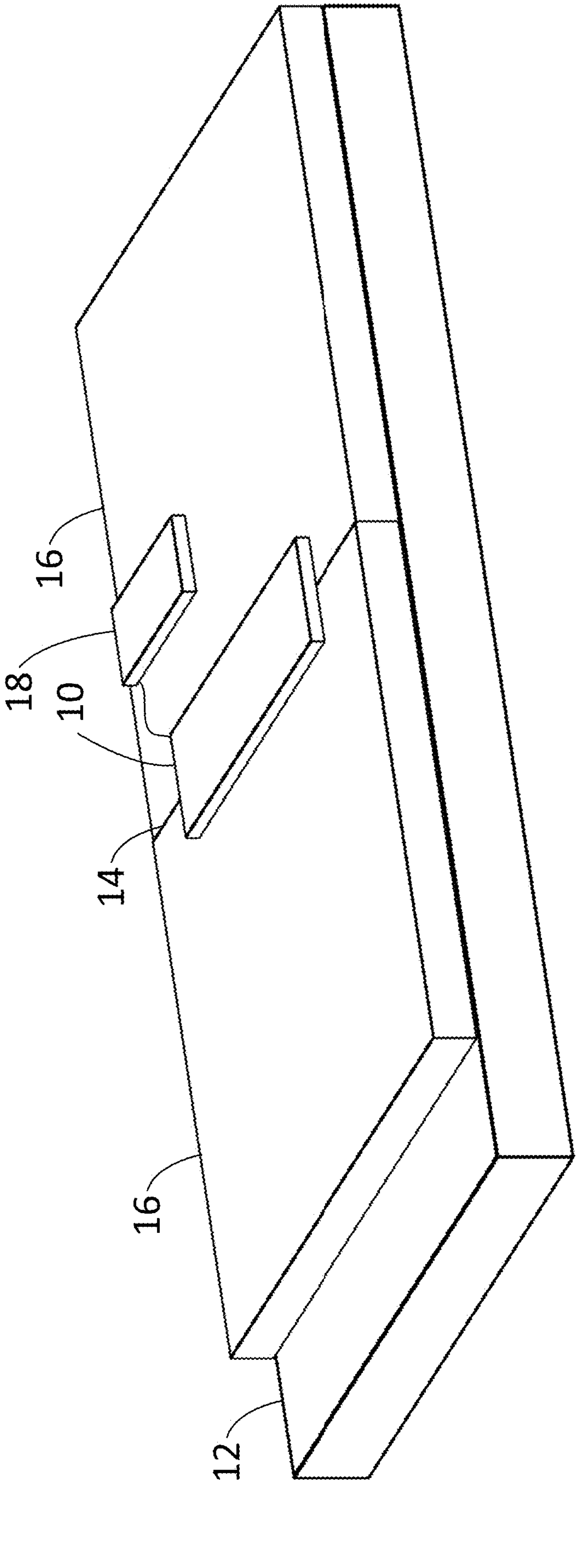
FIG. 1 is a temperature monitor on a roof, in accordance with an embodiment.

Referring to FIG. 1, illustrated therein is a temperature monitor 10, in accordance with an embodiment. The temperature monitor 10 is positioned on a roof 12 for measuring the temperature on the roof 12. The temperature monitor 10 may be embedded within the roof 12 and may be integral with the roofing material.

The roof 12 may be, for example, a flat roof of a commercial or industrial building. The temperature monitor 10 may be positioned proximate to a roof seam 14. The roof seam 14 is a connection of adjacent roofing panels 16. The temperature monitor 10 may be installed directly over the roof seam 14 such that any heat generated on the roof 12 would occur first at the location of the temperature monitor 10. The seam 14 may be central to the roof 12 or may be at an edge seam 12 adjacent the edge of the roof 12. The temperature monitor 10 may be in a tape shape or a panel shape.

The temperature monitor 10 may include a roof sensor communication device 18 attached to the base for transmitting measurement data received from the temperature sensor. The roof sensor device is described in more detail with respect to FIG. 7.

In certain embodiments, one or more of the temperature monitors 10 may be part of a system for roof monitoring. For example a plurality of temperature monitors 10 may be positioned on the same roof 12 at various locations, including locations proximate to roof seams 14.

The temperature monitor 10 may provide monitoring for when the roof seam has been sealed and automatically alert clients and workers of the rise in temperature. The temperature monitor 10 may provide real time temperature to remotely monitor the temperature of the roof. In certain embodiments, the temperature monitor may take temperature measurements periodically (e.g., every 20 seconds).

In certain embodiments, the temperature monitor 10 may be one time use. In some cases, once the roof seam is sealed and the temperature normalizes overnight, the sensor no longer senses temperature, as there is a low risk of fire. The temperature monitor 10 may have a batter supply for only a few days or weeks. In this case, the roof sensor communication device 18 may be removed.

The temperature monitor 10 may be waterproof and seal the electrical connections off from water. The temperature monitor 10 may also be weatherproof.

Figure 2A:
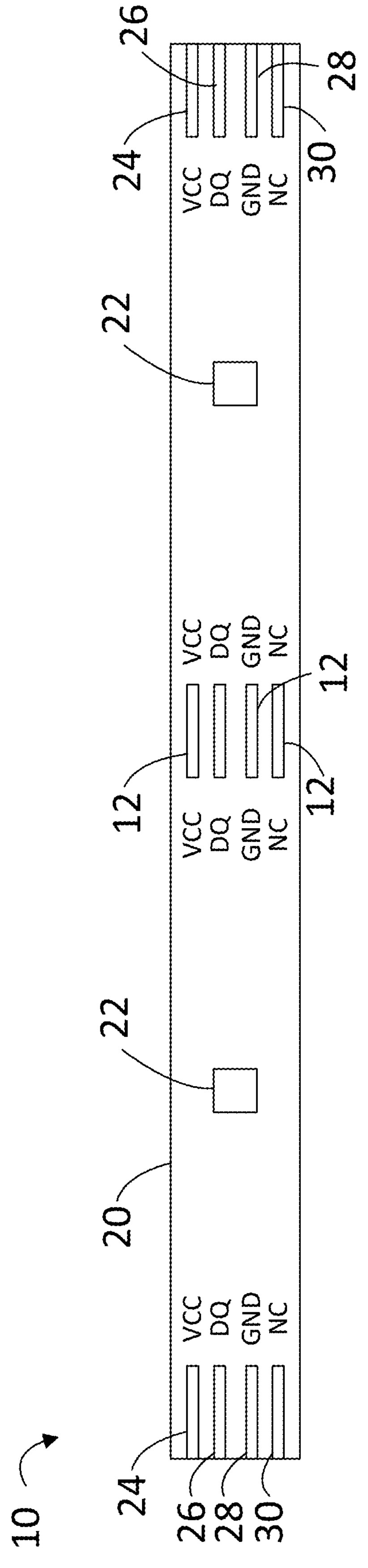
FIGS. 2A and 2B are top and bottom views, respectively, of a temperature monitor, in accordance with an embodiment.
Figure 2B:
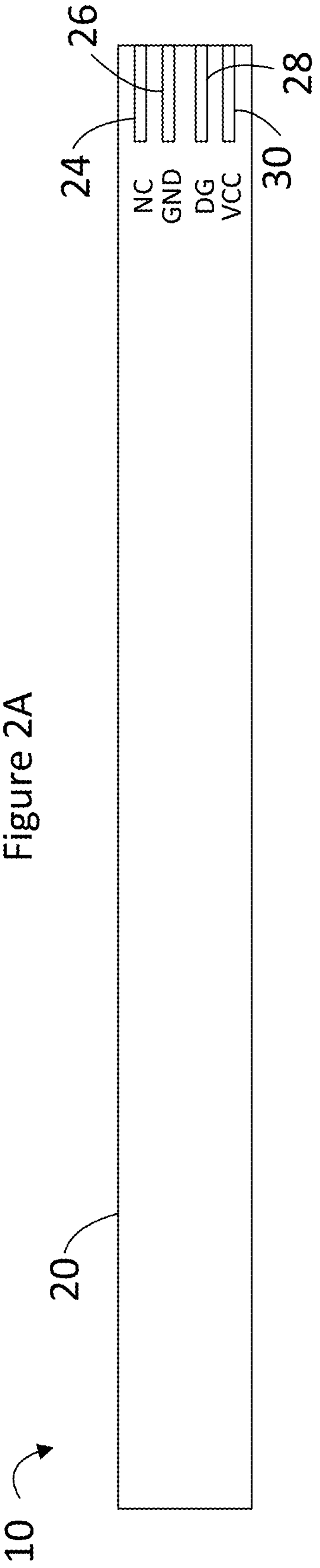

Turning now to FIGS. 2A and 2B, illustrated therein is the temperature monitor 10, in accordance with an embodiment. The temperature monitor 10 includes a base 20 that attaches to the roof 12. The base 20 may be attached for example, with an adhesive or a fire gun, to the roof 12.

The temperature monitor 10 includes a temperature sensor 22 for detecting changes in temperature. The temperature sensor 22 detects the temperature on the roof. The temperature sensor 22 is attached to the base 20. The temperature sensor 22 is positioned periodically on the base 20. The temperature monitor 10 advantageously positions the temperature sensors 22, in locations where there is a heightened risk of fire. The temperature sensors 22 may contact directly with the roof.

The temperature sensor 22 is electrically connected to a plurality of circuitry. The circuitry includes an integrated circuit (IC) power supply pin (VCC) connection 24, a data signal (DQ) connection 26, a ground (GND) connection 28, and a no connection (NC) 30. The circuitry is positioned between the temperature sensors 22 such that the base 20 may be cut at the circuitry between the temperature sensors 22, so that the temperature monitor 10 may be adjustable in length. The circuitry is positioned on both the top surface of the base 20 and the bottom surface of the base 20 such that the circuitry from adjacent pieces of the temperature monitor 20 can connect.

Figure 3A:
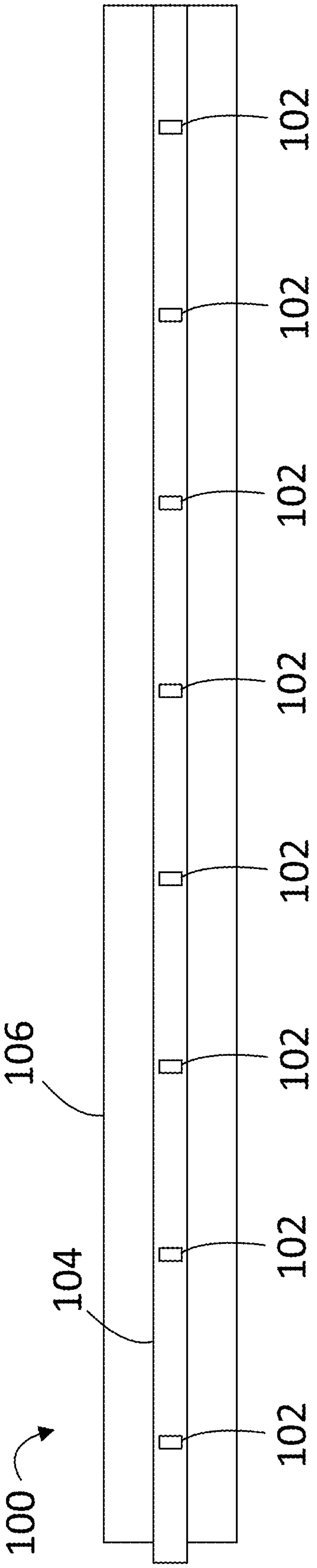
FIGS. 3A and 3B are top and bottom views, respectively, of a temperature monitor, in accordance with a further embodiment.
Figure 3B:
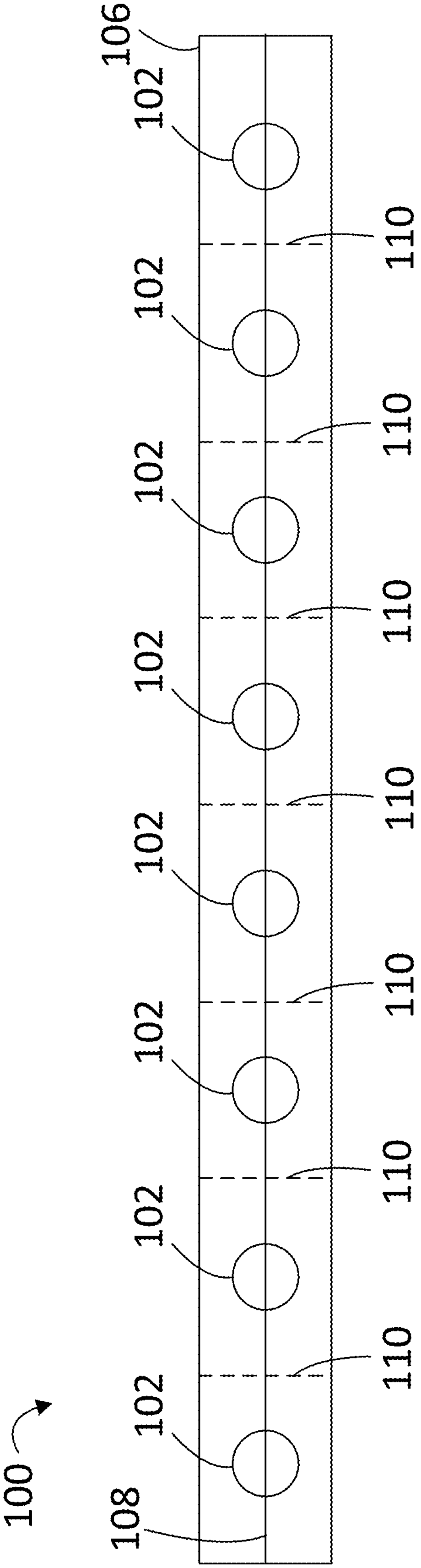

Turning now to FIGS. 3A and 3B, illustrated therein is a temperature monitor 100, in accordance with a further embodiment. The temperature monitor 100 includes a plurality of temperature sensors 102. The temperature sensors 102 are embedded in a strip 104 central to the temperature monitor 100. The strip 104 is affixed to a base 106 that spans the length of the temperature monitor 100. The temperature sensors 102 are positioned along a central axis 108.

The temperature monitor 100 includes a plurality of segmenting indictors 110 positioned between the temperature sensors 102. The segmenting indicators 110 indicate the location for a possible cut of the base 106, such that the temperature sensor 102 is not damaged by cutting the base 106. Accordingly, the temperature monitor 100 can be cut to length based on the desired length.

Figure 4A:
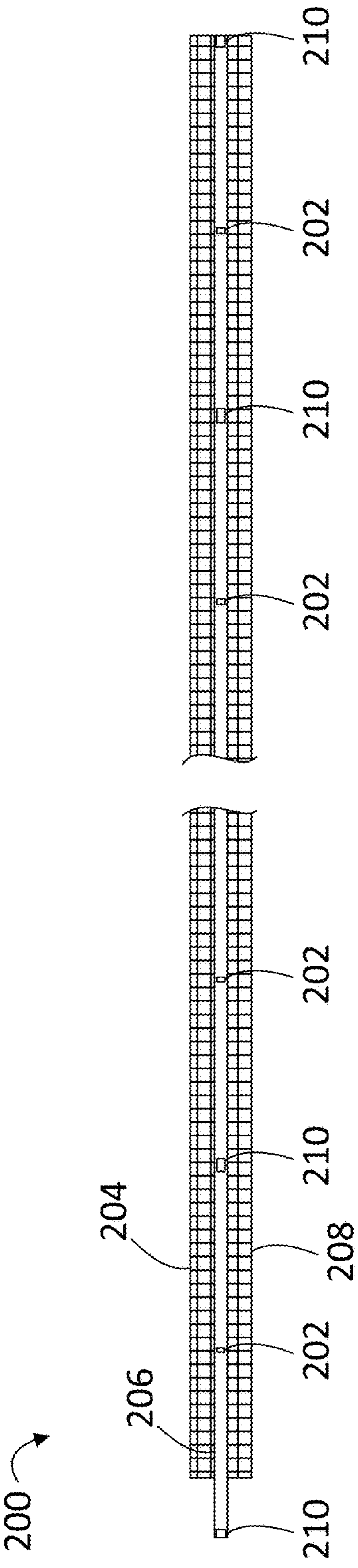
FIGS. 4A and 4B are top and sectional views, respectively, of a temperature monitor, in accordance with a further embodiment.
Figure 4B:
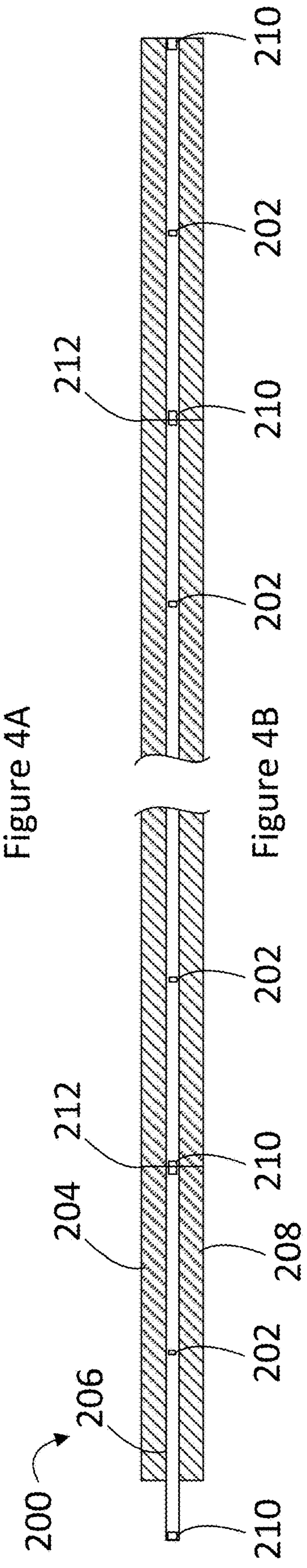

Turning now to FIGS. 4A and 4B, illustrated therein is a temperature monitor 200, in accordance with a further embodiment. The temperature monitor 200 includes a plurality of temperature sensors 202 for sensing temperature change. The temperature monitor 200 includes a first, upper layer 204, a second, strip layer 206, and a third, bottom layer 208. The temperature sensor 202 is mounted within the second, strip layer 206. The second, strip layer 206 also includes a connector 210 located between the temperature sensors 202. The temperature monitor 200 may have a segmenting indicator 212 located at the connectors 210 such that the temperature monitor 200 can be cut to length.

Figure 5A:
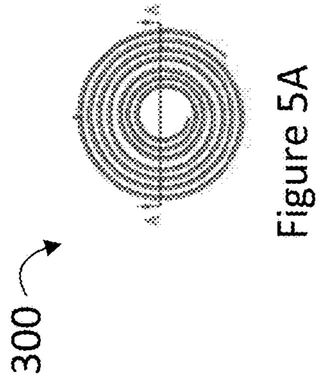
FIGS. 5A through 5C are side roll, sectional, segmented sectional views, respectively, of a temperature monitor, in accordance with a further embodiment.
Figure 5B:
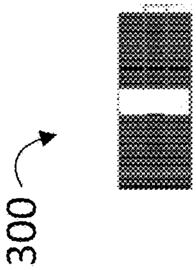
Figure 5C:
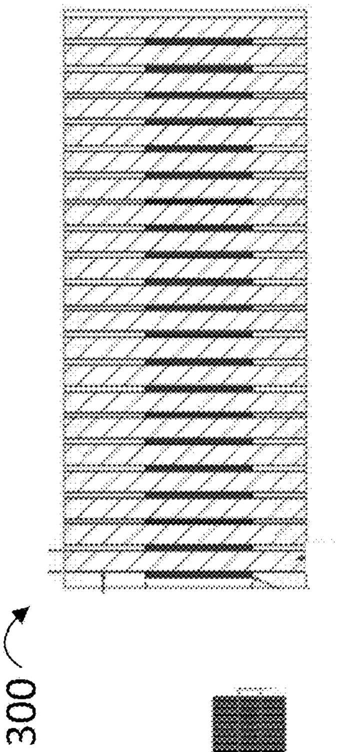

Turning now to FIGS. 5A through 5C, illustrated therein is a coiled temperature monitor tape 300, in accordance with an embodiment.

Figure 6:
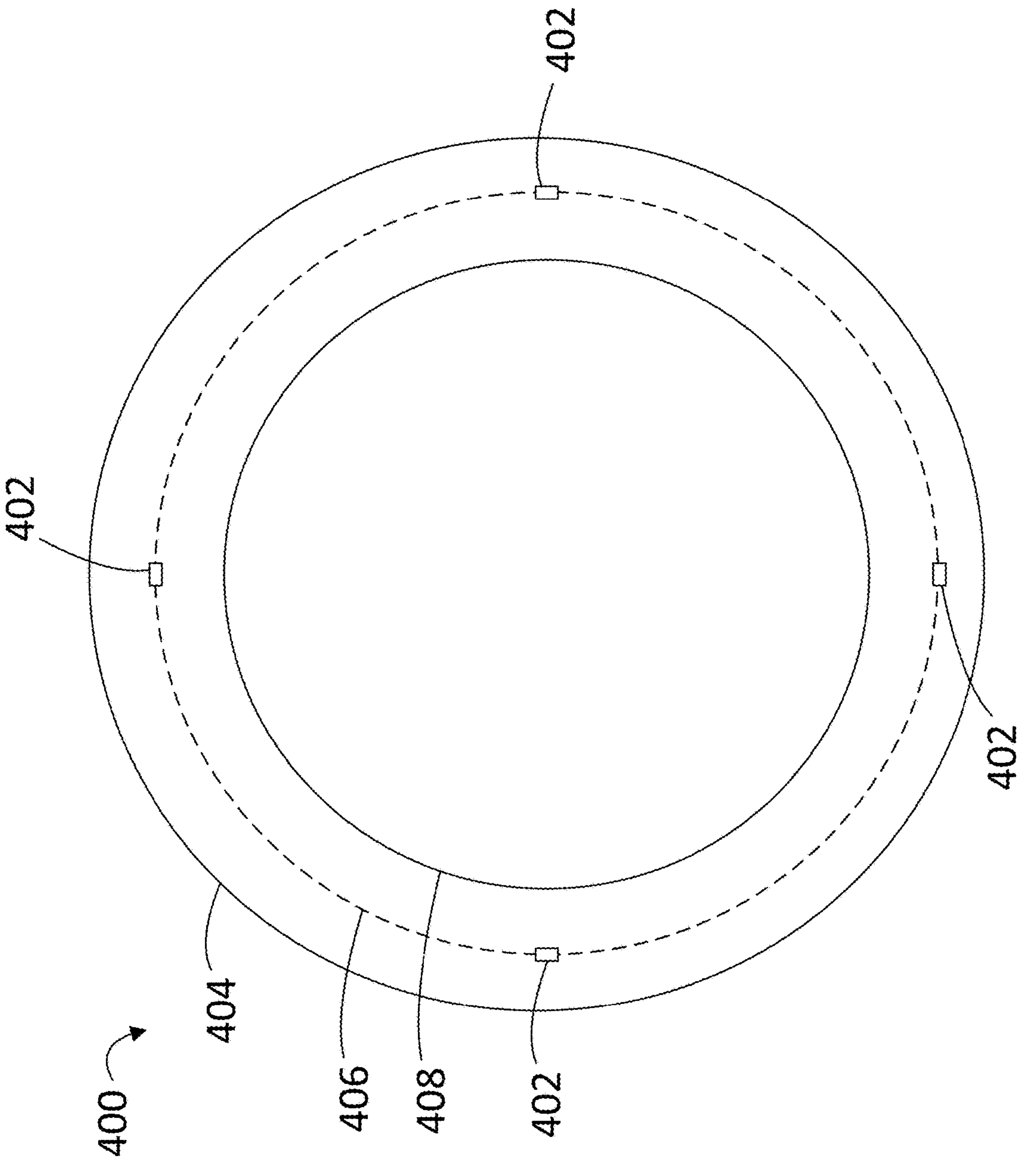
FIG. 6 is a top view of a temperature monitor, in accordance with a further embodiment.

Turning now to FIG. 6, illustrated therein is a temperature monitor 400, in accordance with an embodiment. The temperature monitor 400 includes at least one temperature sensor 402 for measuring changes in temperature. The temperature sensor 402 is mounted to a base 404. The temperature sensor 402 may be mounted along a center line 406 of the base 404. The base 404 may include a cutout 408 such that the temperature monitor 400 may be placed around an item, such as a drain seam. As shown from FIG. 6, the base 404 may be circularly shaped and the center line 406 and the cutout 408 may also be circular. The drain area may be a particularly high fire risk area.

In further embodiments, the temperature monitor 400 may be provided in different predefined shapes based on the desired locations for temperature monitoring, for example, at roof flashing.

Figure 7:
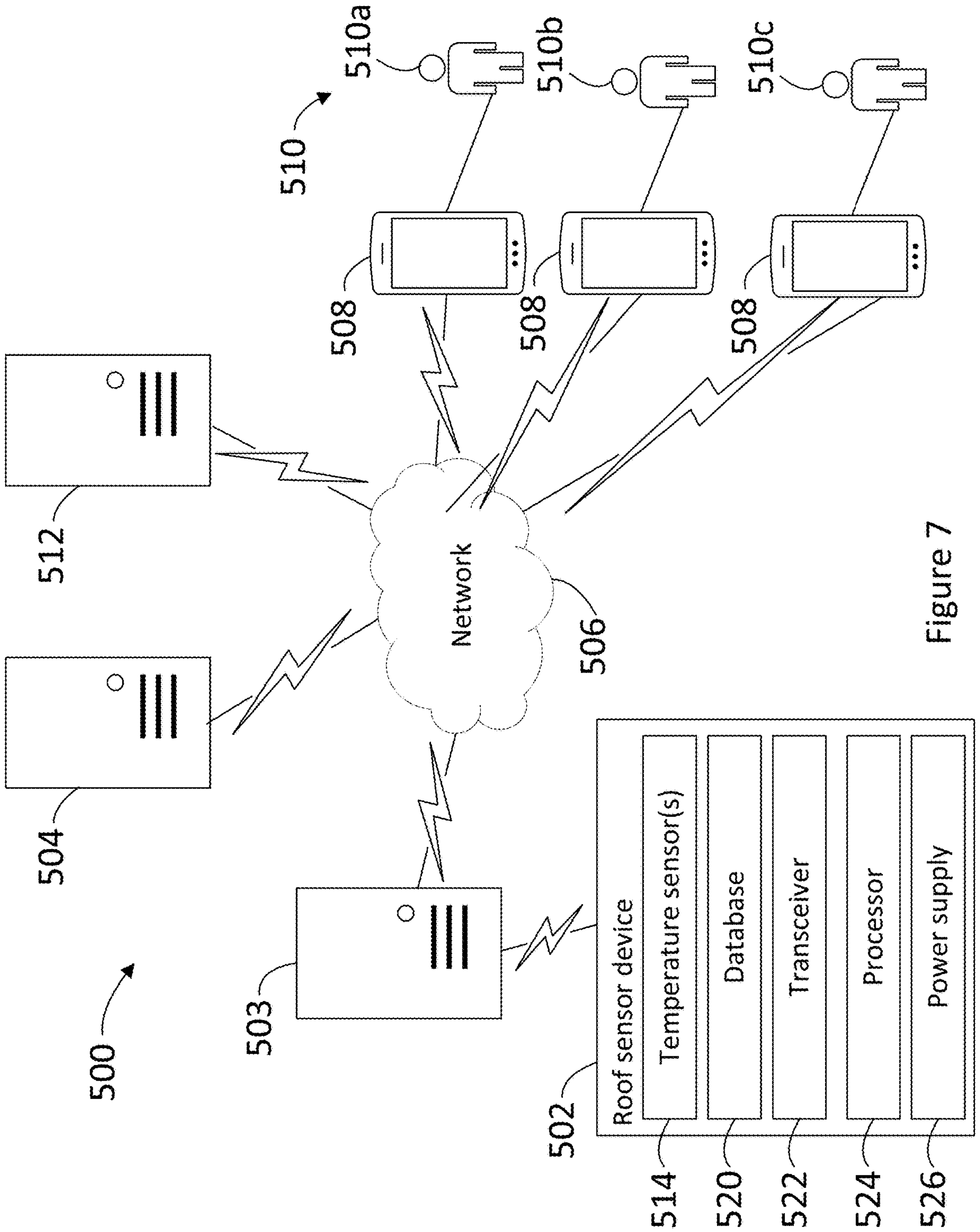
FIG. 7 is a block diagram of a roof monitoring system, in accordance with an embodiment.

Referring to FIG. 7, illustrated therein is a temperature monitoring system 500, in accordance with an embodiment. The temperature monitoring system 1000 includes a roof sensor device 502, such as the temperature monitor 10, 100, 5200, 300, 400, as described with respect to FIGS. 1-6. The roof sensor device 502 includes at least one temperature sensor 514 such as the temperature sensors, as described with reference to FIGS. 1-6.

The roof sensor device 502 measures a temperature and transmits a temperature signal to a system gateway 5103 which transmits a communication to a system server 504. The roof sensor device 502 communicates directly with the system gateway 503 (e.g., Near Field Communication (NFC), Bluetooth™, etc.), and/or the roof sensor device 502 may communicate with the system gateway 503 over a network 506 (e.g., the Internet).

The system gateway 503 may be located in the building where the roof sensor device 502 is installed. The system gateway 503 receives the measurement data from the roof sensor device 502 and transmits the measurement data to a system server 504 via the network 506. The gateway 503 may be installed near a window, for improved communication, in the building holding the roof sensor device 502. The gateway 503 is connected to the network 506 (e.g., via Ethernet and/or GPRS (General Packet Radio Service)) and the power source is connected. The gateway 503 includes an antenna that is directed upward towards the roof sensor device 502.

In an embodiment, the gateway 503 is integral with the sensor device 502. The sensor device 502 communicates directly with the system server 504. The data transmit module is embedded into the sensor box.

The system server 504 is a central portal and includes a database for storing roof data. The system server 504 stores statistical data and maintenance records about the roof. The statistical data and maintenance records may be provided from contractors and trades service companies that have performed installation or maintenance services on the roof. The system server 504 may be maintained by the service provider for roof sensor device 502 customers. The system server 504 may be accessed in locations provided with network 506 connections to check property status and history records.

The system server 504 sends roof data, alerts, and warnings to a user communication device 508. The user communication device 508 is for example, a mobile device, a mobile phone, a tablet, a smart phone, a laptop, a purpose built computer, a general purpose computer, or the like. The user communication device 508 has communication capabilities to receive and send temperature data. The user communication device 508 also has data display capabilities to display information to a user 510. In certain embodiments, there may be a plurality of user communication devices 508 for a plurality of users 510.

The users 510 may be, for example, a property manager user 510*a*, a roofer user 510*b*, a consultant, or an insurance company user 510*c*. The users 510 are grouped with categories and are provided with different services.

The property manager user 510*a* is able to add, remove, view, and update property information. The property manager user 510*a* can login and logout of the system to check the sensor status online. The property manager user 510*a* can register contacts for property for notifications. The property manager user 510*a* can authorize roofer users 510*b* for access and register roofer users 510*b* for service. The property manager user 510*a* can inform trades and maintenance providers with information and timelines. The property manager user 110*a* can verify warranty alarms. The warranty alarm may automatically provide a notice to the property manager user 510*a* that the warranty period for the roof is about to expire so that the property manager user 110*a* can initiate an inspection of the roof prior to expiry of the warranty period.

The roofer user 510*b* can monitor a customer's roofs, receive notifications if service is needed and find potential business.

The insurance company user 510*c* can track the historic data of a client's roof such as statistical data for geographic area roofing information. The insurance company user 510*c* may be able to reduce the risk for damages to the building from roofing flood, collapse, and fire.

The system server 504 also receives information from third party databases 512. The third party databases 512 provide information related to weather and satellite data. The third party data may include history maintenance records, weather alarms, and property construction details, for example.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The temperature monitoring system 500 includes the roof sensor device 502, which communicates with the system gateway 503, the system gateway 503 which communicates with the system server 504, the system server 504 which communicates with the plurality of user communication devices 508, via the network 506. The roof sensor device 502, the system gateway 503, and the server 504 may be purpose built machines designed specifically for roof monitoring. The roof monitoring device 502, the system gateway 503, and system server 104 may receive, process, and deliver roof monitoring data.

The roof monitoring device 502, the system gateway 503, the system server 504, and user communication devices 508 may be a server computer, desktop computer, notebook computer, tablet, PDA, smartphone, or another computing device. The devices 502, 503, 504, 508 may include a connection with the network 506 such as a wired or wireless connection to the Internet. In some cases, the network 506 may include other types of computer or telecommunication networks. The devices 502, 503, 504, 508 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 506. Input device may include any device for entering information into devices 502, 503, 504, 508. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, devices 502, 503, 504, 508 may include multiple of any one or more of processors, applications, software modules, second storage devices, network connections, input devices, output devices, and display devices.

Although devices 502, 503, 504, 508 are described with various components, one skilled in the art will appreciate that the devices 502, 503, 504, 508 may in some cases contain fewer, additional or different components. In addition, although aspects of an implementation of the devices 502, 503, 504, 508 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 502, 503, 504, 508 and/or processor to perform a particular method.

The devices such as the roof sensor device 502, the system gateway 503, the system server 504, and the user communication devices 508 are described performing certain acts. It will be appreciated that any one or more of these devices 502, 503, 504, 508 may perform an act automatically or in response to an interaction by a user of that device. That is, the user of the device may manipulate one or more input devices (e.g. a touchscreen, a mouse, or a button) causing the device to perform the described act. In many cases, this aspect may not be described, but it will be understood.

The roof sensor device 502 includes a database 520 for storing measurement data received from the temperature sensor 514 (such as the temperature sensor 22 of FIG. 2A). The roof sensor device 502 includes a processor 524 for processing the measurement data. The roof sensor device 502 includes a transceiver 522 for sending and receiving data messages from any one or more of the user communication devices 508, the system server 504, and the third party databases 512 via the system gateway 503.

The roof sensor device 502 includes a power supply 526 for providing power to the transceiver 522, database 520, and processor 524. The power supply 526 may be a hard wired connection, and/or a battery power supply. The power supply 526 may be designed to provide power to the roof sensor device 502 for a long period of time (e.g., years) or a few weeks.

The roof sensor device 502 may also receive third party weather data from the third party databases 512, to confirm hot weather events, and the roof sensor device 502 will more frequently measure the temperature. Where there are not hot weather events, the roof sensor device 502 may enter a standby mode, measuring the temperature less often and conserving energy from the power supply.

The power supply 526 and other roof sensor device 502 components may be resistant to extreme heat (e.g., 60 degrees Celsius) generated on the roof as well as extreme cold (e.g., −40 degrees Celsius) through winter months. The communication system, may also include reflective surface to reflect light and radiant heat energy to reduce the heat of the roof sensor device 502, including the power source.

In certain embodiments, the power supply 526 includes a solar panel and a rechargeable battery. When solar energy is received, the solar panel provides recharging energy to the rechargeable battery. As the roof sensor device 526 is located on the roof of a building, the solar panel may be provided with a direct line of solar energy.

In certain embodiments, the database 520, the transceiver 522, the processor 524, the power supply 526, and other circuitry of the roof sensor device 502 may be in a communication box.

Figure 8:
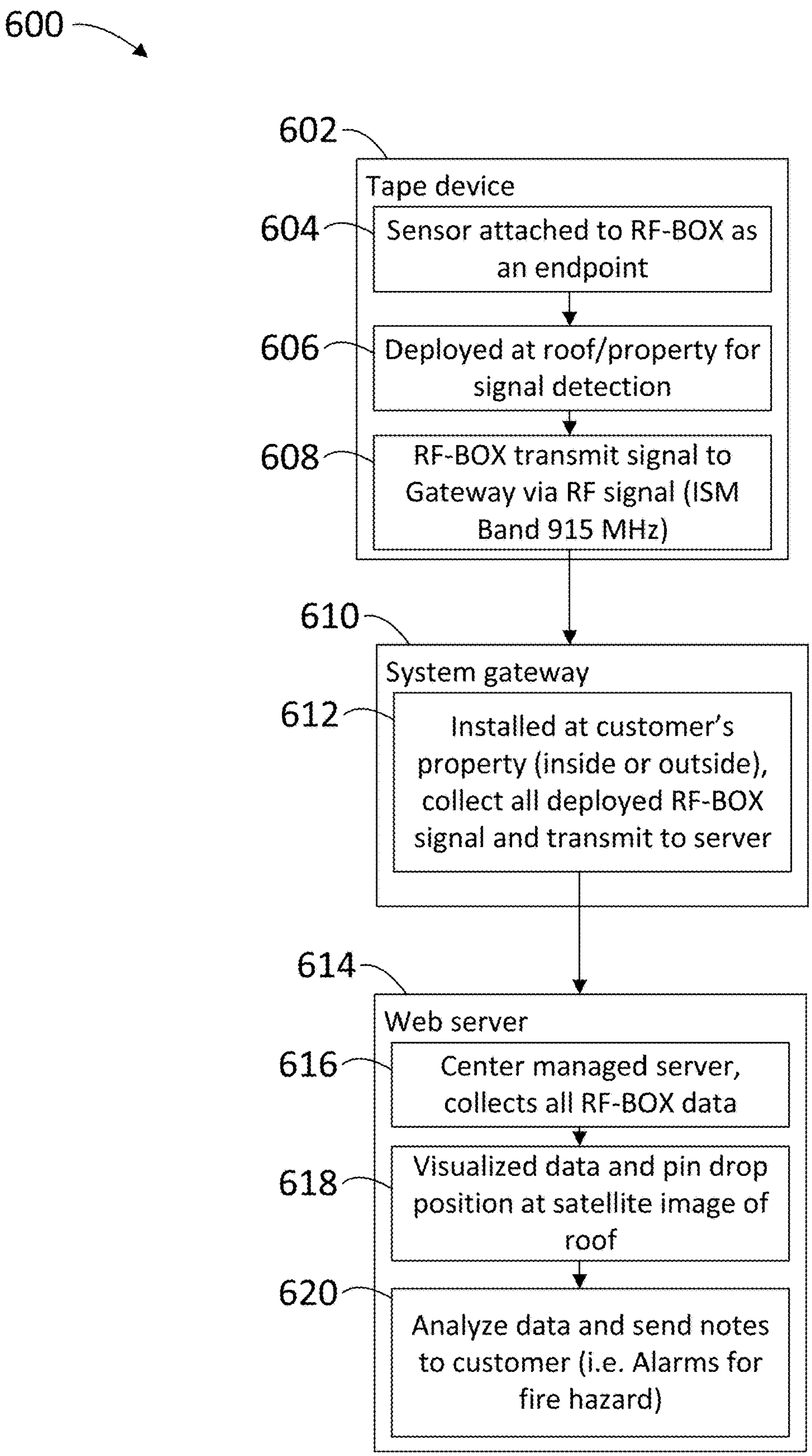
FIG. 8 is a flow chart of a method for roof monitoring, in accordance with an embodiment.

Referring now to FIG. 8, illustrated therein is a method for roof monitoring 600, in accordance with an embodiment. At 602, the temperature monitor (e.g., 10, 100, 200, 300, 400, 502) is positioned at a roof seam. The tape is affixed to the roof proximal to a roof seam. The sensor box cover is opened and the temperature monitor is turned on.

Optionally, the user may perform a battery check. The user may also verify that LED indicators are functioning properly. For example, a red and a blue LEDs blink for 1 second, then go off and a moment later, the red LED flashes 5 times. If the red LED does not flash 5 times or keep flashing, the temperature monitor is out of signal range or in a blind spot.

Optionally, the user may perform a sensor test by triggering the temperature sensor with a heat gun for 5 seconds. The red LED should then flash.

Once the roof sensor device 502 is installed on the roof, the installer marks a sensor device identifier on a roof map to register the location of the roof sensor device.

At 604, the sensor takes a reading. At 606, the RF-BOX detects the sensor reading. At 608, the RF-BOX transmits a signal to a system gateway 610. At 612, the system gateway 610 collects the RF-BOX signals and transmit the RF-BOX signals to a web server 614 (e.g., system server 504).

At 616, the web server 614 collects the RF-BOX data. At 618, the web server 614 creates visualization of the RF-BOX data as pin drop position on a satellite image of the roof (see FIGS. 11A, 11B, and 11D, for example). At 620, the web server 614 analyzes the RF-BOX data and sends the visualization to the customer. The data may include a high temperature alarm.

Figure 9:
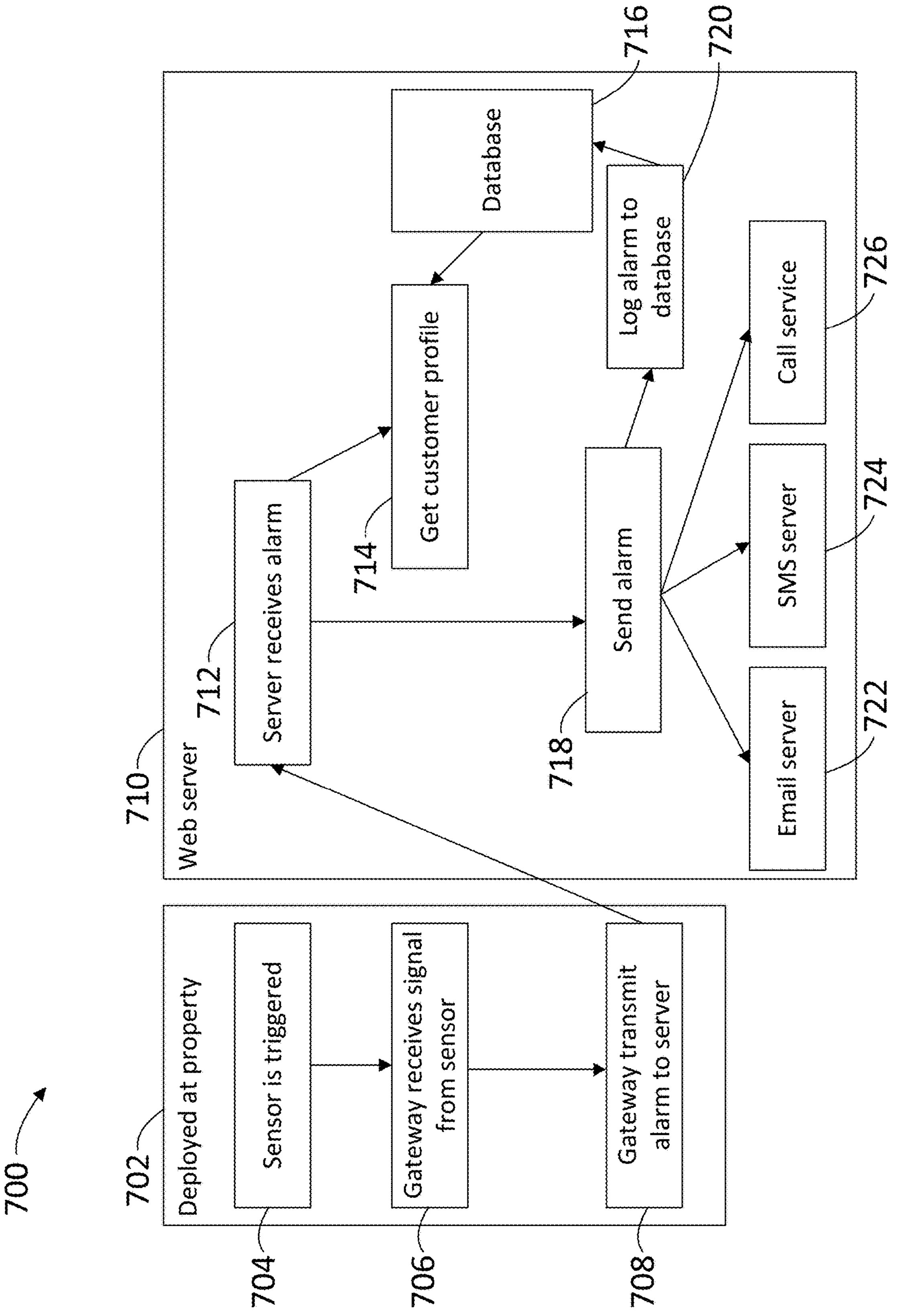
FIGS. 9 and 10 are methods for sending temperature monitor alarms, in accordance with an embodiment.

FIG. 9 illustrates a collecting data state method 700 for sending a temperature alarm, in accordance with an embodiment. The sensor collects the measurement data and posts the measurement data to the server at a predetermined polling period (e.g., every five minutes). The polling period may depend on any one or more of the time of year, user preferences, third party weather data, historic data, and roof design. The server stores the data in the database for analysis and history tracking. If the measurement data reaches the preset threshold or a preset temperature increase rate, the server will then compose an email and/or SMS to contact the client automatically.

At 702, the temperature monitor (e.g. temperature monitor 10 of FIG. 1) is installed at the roof location. A fire alert may be created where the sensed temperature reaches a predetermined threshold, such as 80 or 90 degrees Celsius. The fire alert may be created where the sensed temperature increases in a period of time based on the chemical reaction of the roof sealant. For example, where the sensed temperature increases from 25 to 60 degrees in, for example, 2 seconds. The temperature monitor may also detect a sharp rise in temperature, for example, an increase of 20 degrees Celsius to 50 degrees Celsius in a one minute interval.

When the sensor is triggered, at 704, the temperature monitor sends a fire signal to the gateway. At 706, the gateway receives the fire signal from the temperature monitor and, at 708, the gateway transmits an alarm to the web server.

At 710 the web server processes the alarm. The alarm is received by the web server, at 712. The web server retrieves the customer profile, at 714, from a database 716. The customer profile includes alarm details on who should be notified, and how the user should be notified.

At 718, the web server sends the alarm to the user. The web server logs the alarm in the database at 720. Depending on the type of alarm, the web server emails the alarm at 722, SMS the alarm at 724, or calls in the alarm at 726.

Figure 10:
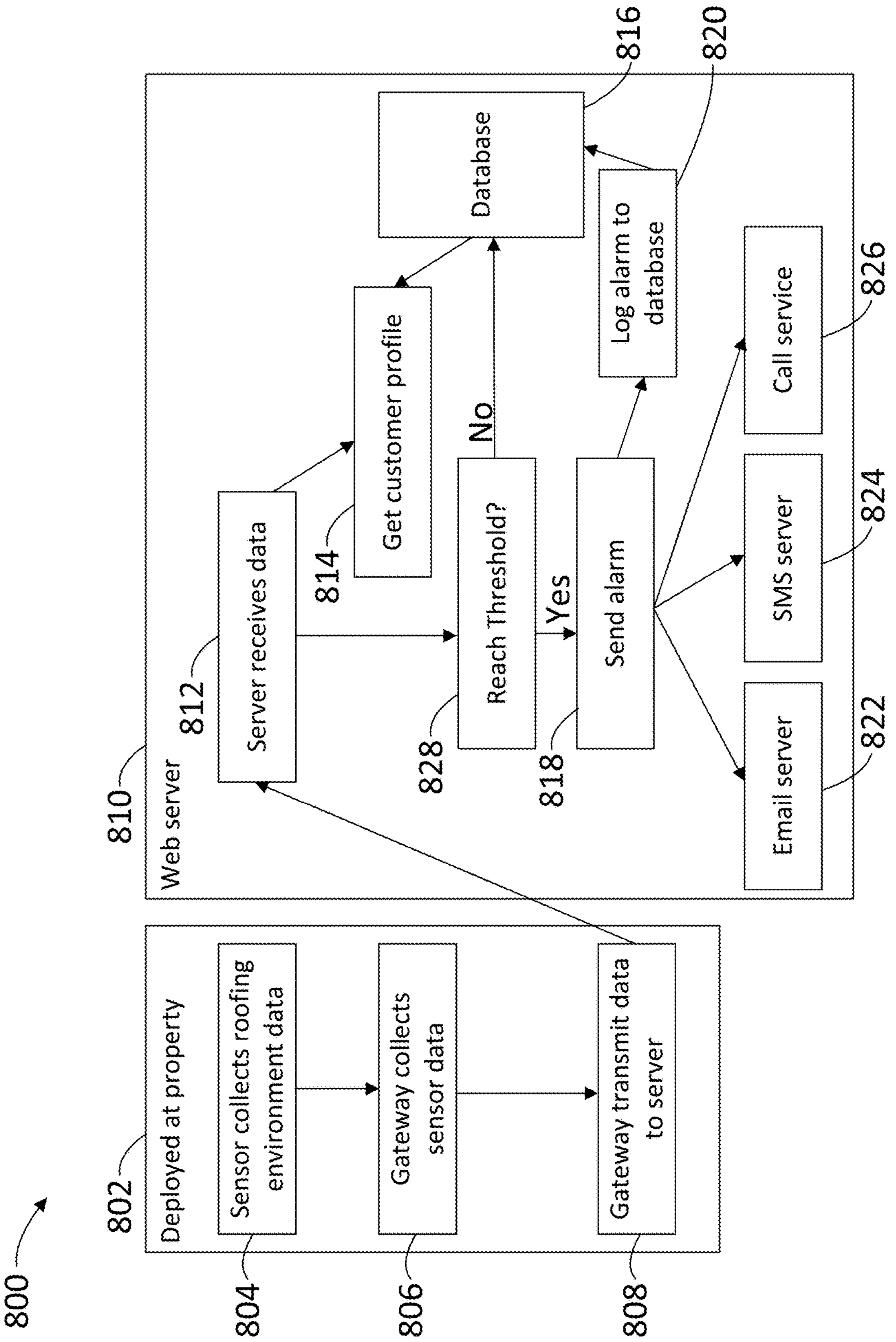

FIG. 10 illustrates a sensor alarm triggered method 800 for sending a fire alarm, in accordance with an embodiment. When the sensor alarm is triggered, the sensor immediately sends out an alarm. The server then transmits the alarms to the users. The server logs the data for data analysis and check.

At 802, the temperature monitor (e.g. temperature monitor 10 of FIG. 1) is installed at the roof location. The sensor collects roofing environment data (such as temperature or humidity), at 804, and the temperature monitor sends the environment data to the gateway. At 806, the gateway receives the environment data from the temperature monitor and, at 808, the gateway transmits the environment data to the web server.

At 810 the web server processes the environment data. The environment data is received by the web server, at 812. The web server retrieves the customer profile, at 814, from a database 816. The customer profile includes details on what type of environmental conditions will trigger an alarm. The customer profile includes threshold data, such as how much temperature and temperature rate increase is required for an alarm to be sent.

At 828, the web server determines if the environment data has reached the threshold. If not, the environment data is saved in the database and no alarm is sent. If the threshold has been met, the web server sends the alarm to the user, at 818. The web server logs the alarm in the database at 820. Depending on the type of alarm, the web server emails the alarm at 822, SMS the alarm at 824, or calls in the alarm at 826.

Referring now to FIGS. 11A-11E, illustrated therein are screenshots of a temperature monitoring application, in accordance with an embodiment.

Figure 11A:
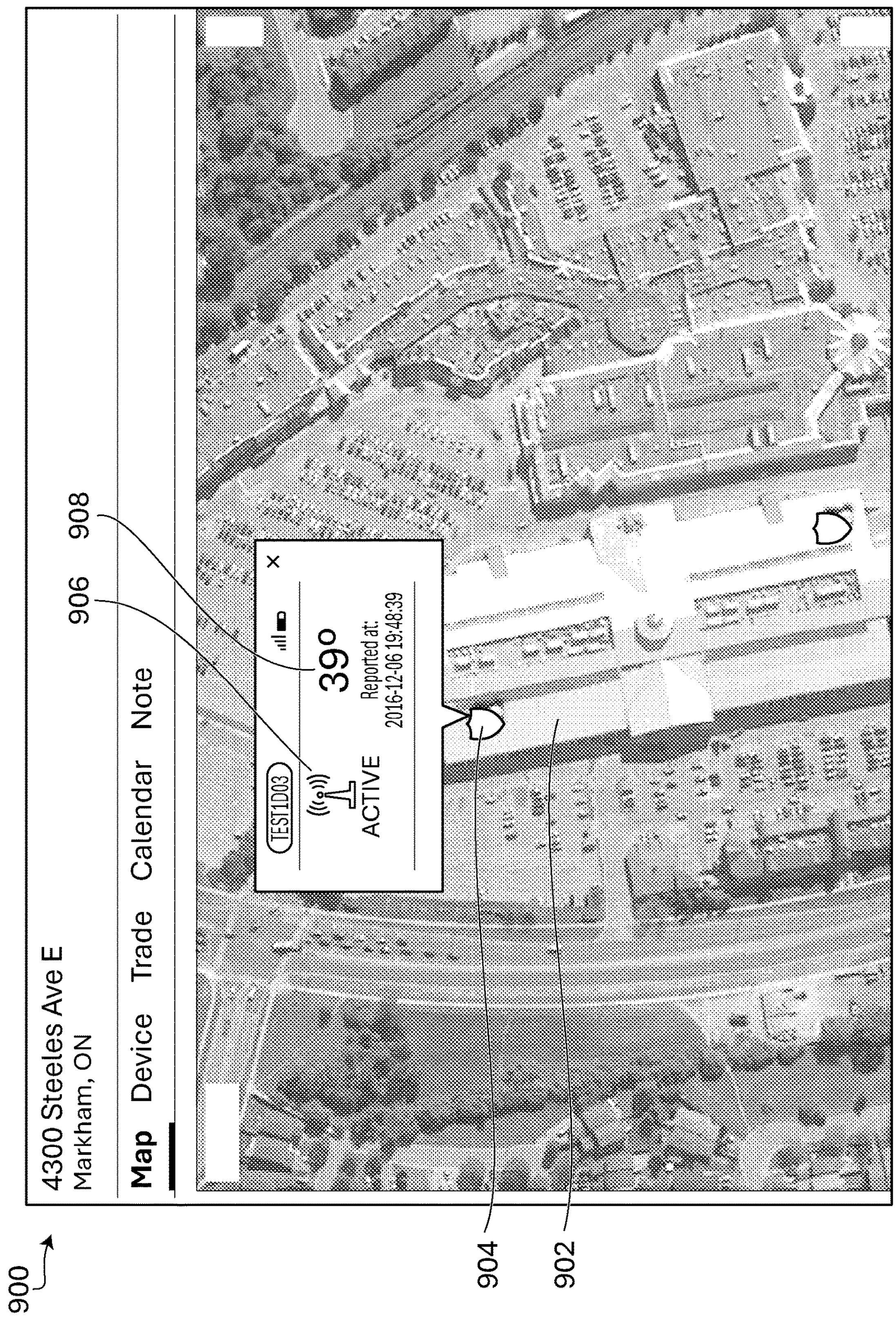
FIGS. 11A-11E are screenshots of visualization of roof data, in accordance with an embodiment.

FIG. 11A illustrates a map view of the temperature monitoring application 900 showing an aerial image of a building 902 having at least one temperature monitor 904 thereon. The temperature monitoring application 900 shows the location of each temperature monitor 904. The temperature monitoring application 900 also shows an active state indicator 906 for indicating whether the temperature monitor 904 is active, inactive, or alarmed. The temperature monitoring application 900 also shows an temperature value indicator 908 for indicating the temperature level of the temperature monitor 904. The temperature monitor 904 may be identified with an icon that is color coded (green for active, red for inactive), and a temperature value amount. The temperature monitoring application 900 may also include the temperature reading date and time as well as battery level and signal strength.

Figure 11B:
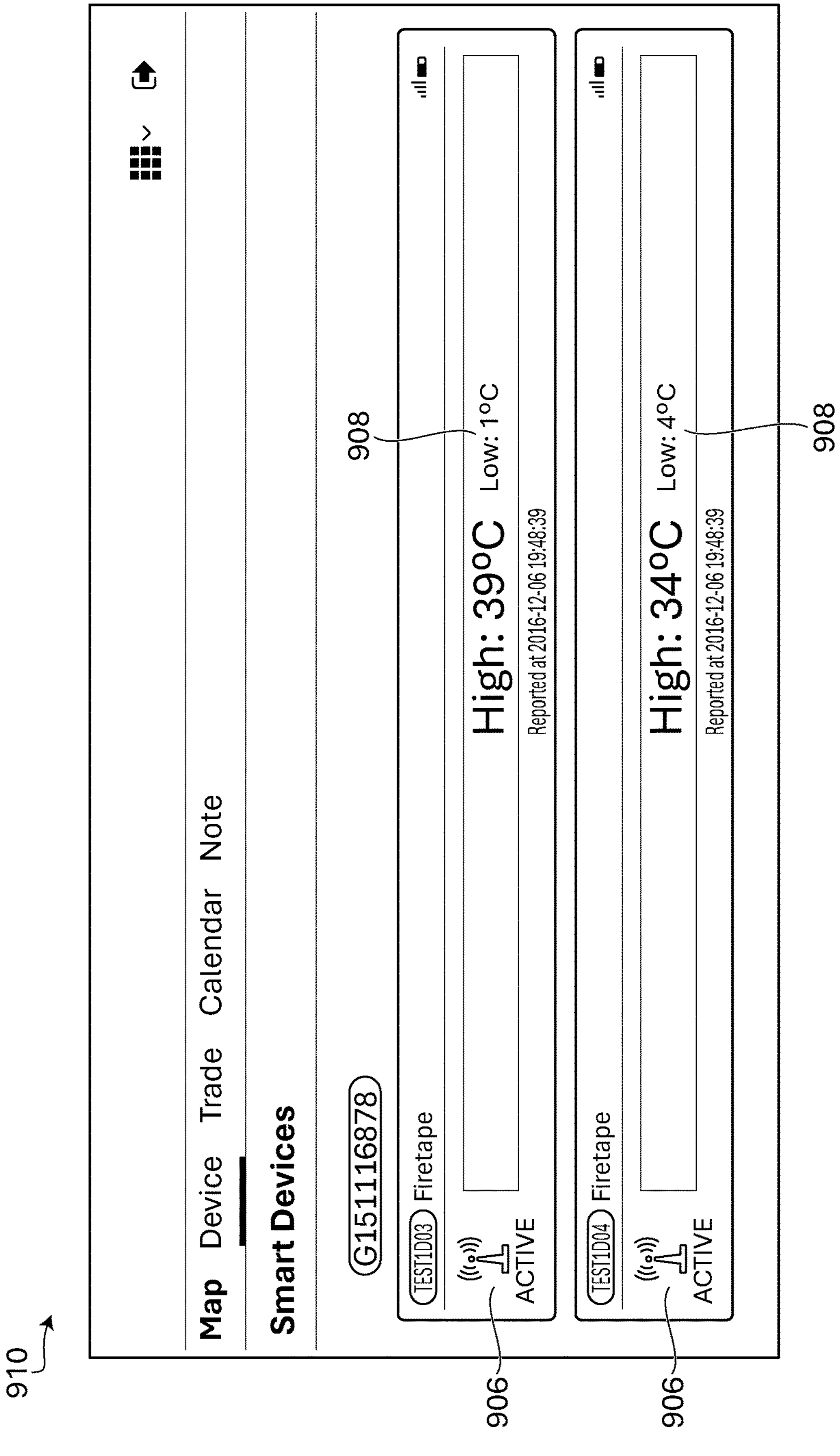

FIG. 11B illustrates a device view of the temperature monitoring application 910 showing the active state indicator 906 and the temperature value indicator 908. The temperature value indicator may illustrate the temperature value in a ranking, showing low, average, and high temperatures, which can be illustrated with color coding (green for low, orange for average, and red for high/dangerous temperatures).

Figure 11C:
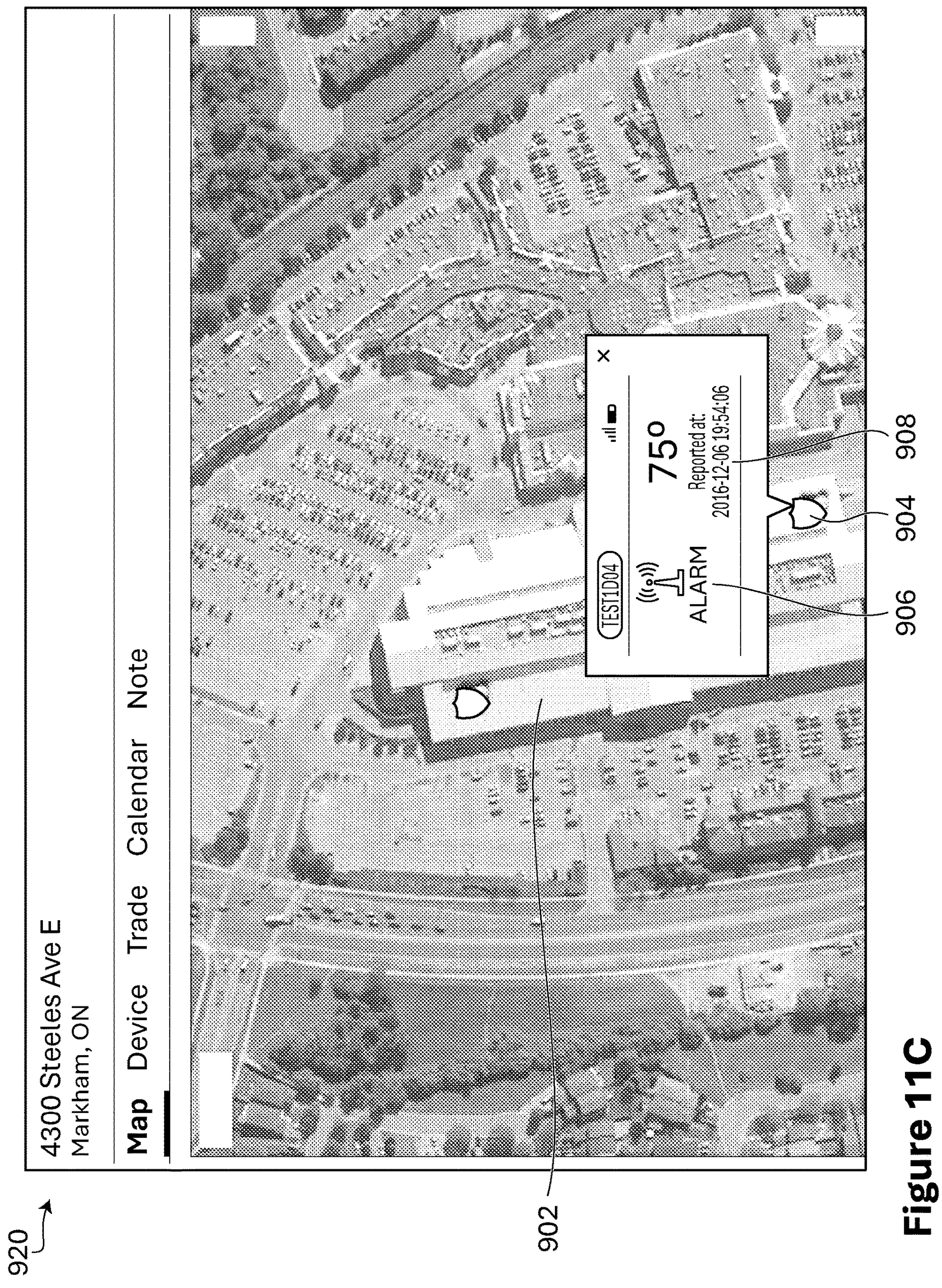
Figure 11D:
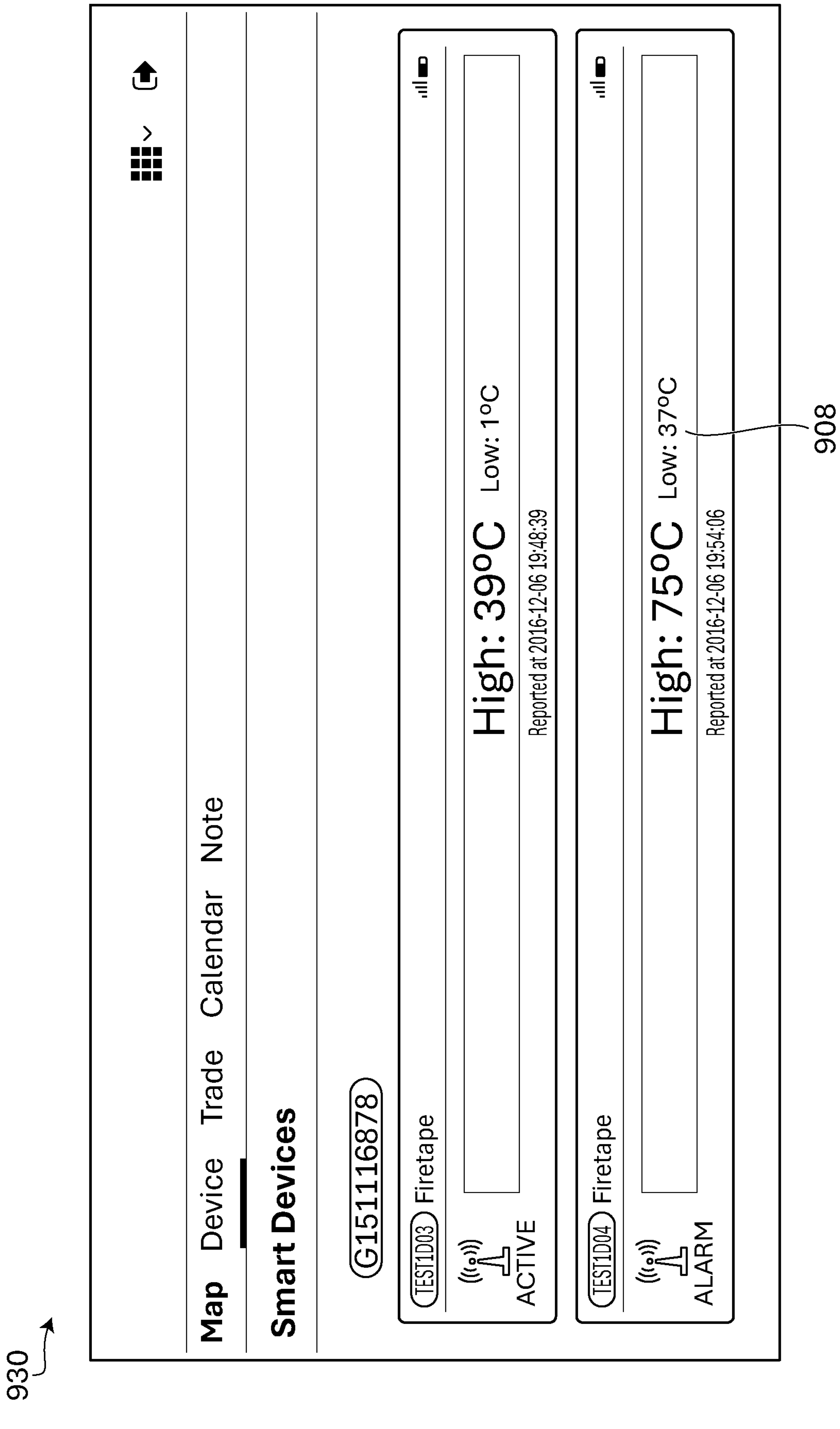

FIGS. 11C and 11D illustrate a map view and a device view, respectively, of the temperature monitoring application 920 showing the temperature monitor 904 having an alarm level. The active state indicator 906 indicates an alarmed level, and the temperature value indicator 908 indicated a high/dangerous temperature. A user may be able to identify the location of the alarmed temperature and may appropriately dispatch emergency response.

Figure 11E:
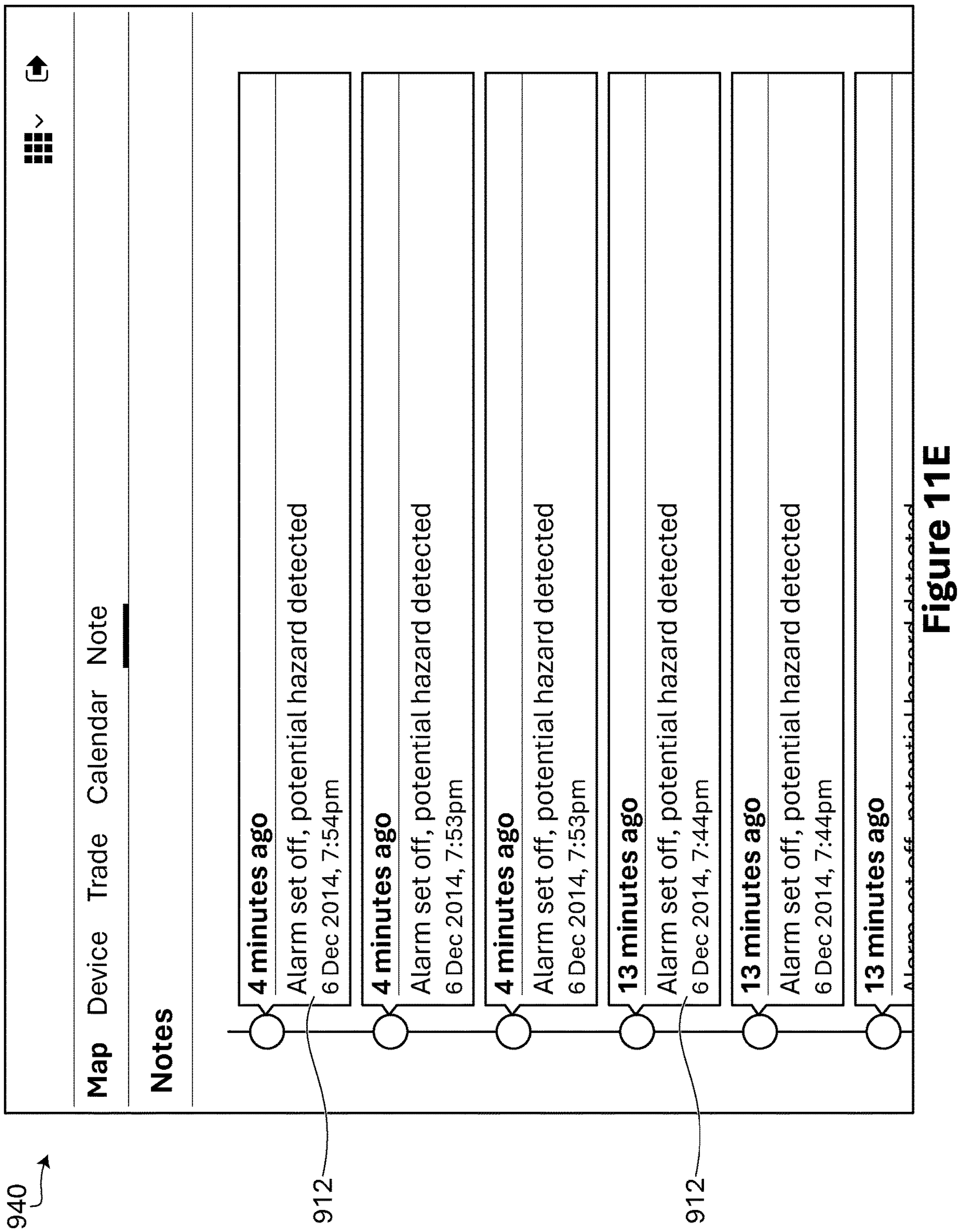

FIG. 11E illustrates a note view of the temperature monitoring application 940 showing details of activity on the temperature monitor 904. The temperature monitoring application 940 includes historical and up to date, time stamped notations that detail changes of state 912 of the temperature monitor 904. In particular, the changes of state 912 may indicate when the alarm is triggered and when a potential hazard is detected.

While the above description provides examples of one or more apparatus, methods, or systems, it will be appreciated that other apparatus, methods, or systems may be within the scope of the claims as interpreted by one of skill in the art.

The invention claimed is:

1. A temperature monitoring system comprising:

a roof sensor device comprising:

at least one temperature sensor for collecting environment data on a roof;

a database for storing the environment data received from the at least one temperature sensor;

a transceiver for sending data messages to a system gateway and receiving data messages from the system gateway; and a processor configured to:

receive the environment data including a temperature on a roof from the at least one temperature sensor;

determine if the temperature has reached a threshold temperature;

when the temperature is below the threshold temperature, store the environment data in the database until a polling request is received from the system gateway at a polling interval; and in response to receiving the polling request, instruct the transceiver to transmit the environment data to the system gateway; and when the temperature has reached the threshold temperature, instruct the transceiver to transmit a fire signal to the system gateway;

the system gateway configured to:

poll the roof sensor device to request the environment data from the roof sensor device;

receive the environment data and the fire signal from the roof sensor device; and transmit the environment data and the fire signal to a system server; and the system server configured to:

receive the fire signal from the system gateway; and send a fire alarm to a user.

2. The temperature monitoring system of claim 1, further comprising:

the system server being configured to receive the environment data and send the environment data and the fire signal to at least one user communication device.

3. The temperature monitoring system of claim 2, wherein the user communication device is configured for any one or more of a property manager user, a roofer user, a consultant user, or an insurance company user.

4. The temperature monitoring system of claim 1, wherein the roof sensor device includes a power supply for providing power to the transceiver, the database, and the processor.

5. The temperature monitoring system of claim 1, wherein the system gateway is configured to receive third party weather data and wherein the roof sensor device modifies a frequency of temperature measurement based on the third party weather data.

6. The temperature monitoring system of claim 1 comprising a plurality of roof sensor devices, and wherein the user communication device displays a location of the roof sensor devices on a satellite image of a building that the roof sensor devices are installed.

7. A computer-implemented method for monitoring a temperature on a roof, the method comprising:

collecting environment data including a temperature on a roof by a roof sensor device;

determining, by a processor of the roof sensor device, if the temperature has reached a threshold temperature;

when the temperature is below the threshold temperature, storing, in a database of the roof sensor, the environment data until a polling request is received from the system gateway at a polling interval; and in response to receiving the polling request, transmitting, by the roof sensor device, the environment data to the system gateway;

when the temperature exceeds the threshold temperature, instructing, by the processor, a transceiver of the roof sensor to transmit, a fire signal to a system gateway;

collecting, by the system gateway, the environment data and the fire signal from the roof sensor device;

transmitting, by the system gateway, the environment data and the fire signal to a system server;

receiving, by the system server, the fire signal from the system gateway;

creating, by the system server, a visualization of the temperature readings; and sending, by the system server, the visualization to a user device.

8. The method of claim 7, wherein the visualization includes a visualization of the fire alarm indicating a high temperature.

9. The method of claim 7 further comprising transmitting, by the roof sensor device, the environment data at a predetermined polling period, the predetermined polling period being based on the environment data collected by the roof sensing device.

10. The system of claim 1, wherein the determining if the temperature has reached the threshold temperature includes determining a rate that the temperature is increasing.

11. The method of claim 7, wherein determining if the temperature has reached the threshold temperature includes determining a rate that the temperature is increasing.

* * * * *